ELECTRONIC KEYBOARD INSTRUMENTS

Original Filed June 29, 1962 3 Sheets-Sheet 1

INVENTOR
POPKO R. DIJKSTERHUIS
YME B. F. J. GROENEVELD
BY THOMAS VERHEY
AGENT

ELECTRONIC KEYBOARD INSTRUMENTS

Original Filed June 29, 1962 3 Sheets-Sheet 2

INVENTOR.
POPKO R. DIJKSTERHUIS
BY
Frank R. Trifari
AGENT

ELECTRONIC KEYBOARD INSTRUMENTS

Original Filed June 29, 1962 3 Sheets-Sheet 3

INVENTOR
POPKO R. DIJKSTERHUIS
YME B. E. J. GROENEVELD
THOMAS VERREY
BY
Frank R. Trifari
AGENT

United States Patent Office

Re. 27,015
Reissued Dec. 29, 1970

27,015

ELECTRONIC KEYBOARD INSTRUMENTS

Popko Reinder Dijksterhuis, Yme Bouwinus Folkert Jan Groeneveld, and Thomas Verhey, Baarn, Netherlands, assignors, by mesne assignments, to U.S. Philips Corporation, New York, N.Y., a corporation of Delaware

Original No. 3,231,661, dated Jan. 25, 1966, Ser. No. 206,306, June 29, 1962. Application for reissue Oct. 24, 1966, Ser. No. 597,180

Claims priority, application Netherlands, July 20, 1961, 267,335

Int. Cl. G10h *1/02*

U.S. Cl. 84—1.26 30 Claims

Matter enclosed in heavy brackets [ ] appears in the original patent but forms no part of this reissue specification; matter printed in italics indicates the additions made by reissue.

*ABSTRACT OF THE DISCLOSURE*

*An electronic musical instrument employing a key actuated mechanism which produces a control voltage varying in intensity in accordance with the intensity with which the key is struck. The control voltage causes oscillations from tone generators to pass to a speaker in a relationship dependent upon the intensity of key striking.*

The invention relates to an electronic keyboard instrument which can be played like a piano by key-actuation but in which mechanical functions, such as the striking of strings with hammers and vibration damping, whether accelerated or not, of the oscillations of the strings, are avoided as much as possible and replaced by electrical functions in a manner such that the characteristic piano tone is imitated as truly as possible.

The piano tone owes its particular character primarily to the following properties:

(1) The initial amplitude of the string vibration which depends upon the intensity with which the key in question is struck.

(2) The decay of the string vibration which decays according to a function having a decrement decreasing with time.

(3) The damping of the string vibration, which is controlled by a damper that engages each string and releases the string as soon and for as long as the key in question is held down, the dampers may also be lifted collectively by a foot actuated pedal.

(4) The number of harmonics of the tone which decrease with decreasing amplitude of the string oscillation and consequently is largest immediately after striking a key and becomes gradually smaller as the tone decays, and in which in general the higher order harmonics disappear more rapidly than the lower order harmonics.

(5) During the decay of the tone, a periodic change takes place in the intensity ratio between even and odd harmonics.

(6) Because the striking of the string, particularly with the lower tones, occurs at a point which is located at one-eighth the length of the string from one end, the seventh and ninth harmonics which, for these tones, would have a jarring influence on the tone, are substantially suppressed.

The electronic means which are used in accordance with the invention to imitate the piano tone as faithfully as possible in any of the above six items will now be described in detail with reference to the accompanying drawings. Twelve tone generators known in similar electronic instruments provide twelve consecutive tones spaced one halftone, from the frequencies of which, which are located apart and from these all tones can be derived by either frequency multiplication and/or-division. Thus the tones corresponding to the usual 88 keys of a standard piano keyboard may be generated.

The first item listed above is satisfied in accordance with the invention by supplying the oscillations produced by tone generators to a member which passes these oscillations only when a control voltage is impressed upon it. The control voltage is produced when a key is struck, the initial value of the control voltage depends upon the intensity with which the key is struck and thereafter decreases to zero. According to one of the features of the invention, this voltage may be derived as a direct voltage from a capacitor which is charged by a voltage pulse occurring when a key is struck and which is discharged successively by the oscillations consequently passed. The above member may be a rectifier which is cut off by a threshold voltage and the voltage produced across the said capacitor more or less neutralizes the threshold voltage of this rectifier. The voltage pulse occuring when striking a key may be produced in accordance with a further feature of the invention by means of a coil within which a magnetic flux changes at a rate which depends upon the intensity with which the key in question is struck.

Item 2 may be satisfied by using a wave-shape for the voltage supplied to the member having a non-symmetrical variation with time, preferably a voltage of a step-like shape. As a result of this, the energy content of the oscillations is largest immediately after the touch and decreases more rapidly than is proportional to the increasing threshold voltage because the threshold voltage of the diode increases as the capacitor is discharged by the oscillations. This effect is further amplified since immediately after the key is struck, the current pulses supplied by the oscillations to the capacitor via the rectifier provide at that time the largest discharge current to the capacitor, which discharge current, decreases as the tone decays. Thus the threshold voltage itself decreases less than is directly proportional with time. In addition, the resistance of the rectifiers used increases when the discharge current decreases as a result of which the decrement decreases further.

According to a further feature of the invention, the third item may be satisfied by associating a permanent-magnetic member with each key, the pole shoes of which member after release of the key are located opposite the limbs or branches of a rigidly connected magnetic circuit, on which, in addition to the above said coil, an auxiliary coil is wound. The inductance of the auxiliary coil is larger in the case of the key being held down than in the case of the key being released and further controls the discharging of the above said capacitor. In the case of a key being released after striking by means of a rectified alternating current which is supplied across the auxiliary coil by a high-frequency voltage source, in which between this voltage source and the auxiliary coil a switch, whether electronic or not may be provided, which is common for all these coils and may be operated by a pedal.

The fourth item may be met in accordance with another feature of the invention by including one or more RC-networks having a non-linear resistance in the circuit of the said capacitor.

The fifth item may be satisfied by giving the oscillations produced by the generators a nonsymmetrical steplike variation as already described under item 2 above.

The sixth item may be satisfied by causing the eighth, sixteenth, twenty-fourth . . . etc. harmonics to be suppressed in the oscillations produced by the tone generators, which, according to another feature of the invention, may be effected by causing the oscillations for each tone to be produced by three generators, the frequencies of which are in the proportion of 1:2:4.

FIG. 1 is of the drawing shows the step like wave-form which is nonsymmetrical with time for a given tone produced by three tone generators having the frequency ratios set forth above.

FIG. 2 diagrammatically shows a part of the device connected with one key for producing the striking or touching voltage.

Figure 1:
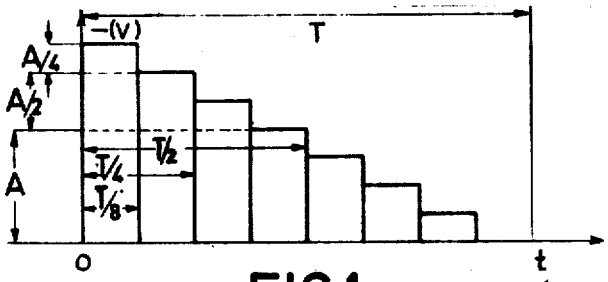

The wave-form shown in FIG. 1 is formed by the superposition of three square-waves having amplitudes A, A/2 and A/4 respectively and periods T, T/2 and T/4 respectively. It is noted that it is essential for satisfactory operation that the square-waves be block-shaped with a flat upper side. Thus as a result of the step-like sawtooth oscillation thus formed the seven stages shown disappear successively as the tone decays with the lowest stage first, as a result of which the even and odd harmonics predominate alternately, which duplicates the tone decay in an actual piano. This effect may be amplified by giving the amplitude of the square-waves having the lowest frequency a value which is more than four times as large as that of the square-waves having the highest frequency.

By suitable choice of the ratio of the amplitudes of the three square-waves, an oscillation may be obtained in which either the odd or the even [harmonicas] *harmonics* predominate which feature has greatest influence on the quality or sound of the tone. Twelve oscillators, for example, Hartley-oscillators tuned respectively to the highest twelve tones of the piano may be used as tone generators and by means of frequency dividers of a known type, for example bistable multivibrators, all the lower fundamental frequencies of the piano may be derived. If each of these latter have the desired amplitude, the whole piano is automatically tuned.

Figure 2:
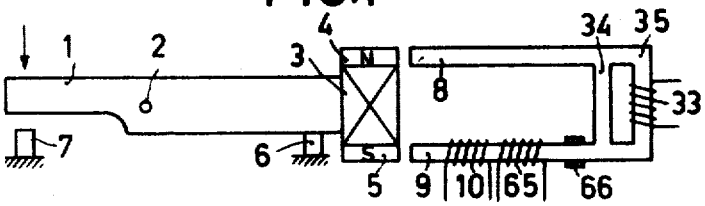
Figure 3:
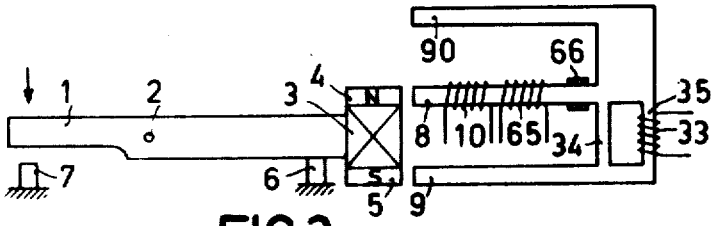
FIG. 3 shows a variation of the device shown in FIG. 2.

The way in which a voltage is produced when striking a key, the intensity of which voltage depends upon the striking intensity, is illustrated in FIGS. 2 and 3.

Each of the keys 1 is rotatable about a shaft 2 and has on its inner end of block 3 of permanent-magnetic material, for example ferroxdure, having two pole shoes 4 and 5. In rest positions the inner end of the key engages a fixed support 6, while the downward motion of the outer end resulting when the key is struck is limited by a fixed stop 7. The two stops are preferably provided with sound-absorbing material such as felt. If the key resides in the rest position shown, limbs or branches 8 and 9 respectively of a magnetic circuit which includes a winding 10 [arc] *are* located proximate or adjacent pole shoes 4 and 5. In the device shown in FIG. 2, the flux produced in this circuit by the ferroxdure in the rest position of the key is maximum, whereas this flux is minimum when the key is held down. The voltage pulse produced in 10 when a key is struck, equals the first differential coefficient of the flux with respect to the time and thus consequently depends upon the intensity with which the key is struck. This voltage pulse is used for charging a capacitor which is shown in FIGS. 4 to 7 described below and indicated therein by reference numeral 11.

In the device shown in FIG. 3, a third limb or branch 90 is provided on the other side of the limb 8 and positioned such that when the key is held down, pole shoes 4 and 5 are located opposite limbs 90 and 8 respectively. In this case, winding 10 around the limb 8 is subjected to flux which not only goes to zero but reverses. Thus the voltage produced in [the] coil 10 is approximately twice as large as the flux in the device as shown in FIG. 2. In addition, the possibility of leakage flux is decreased by this device.

Figure 4:
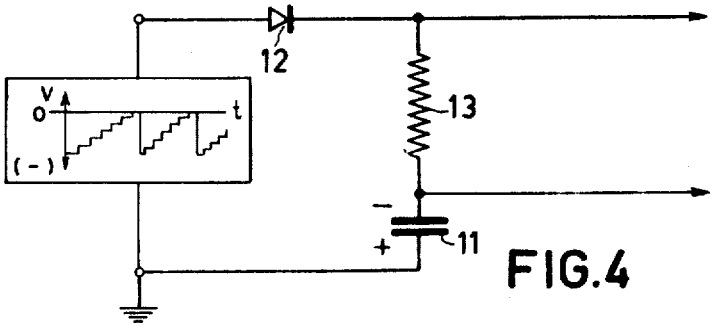
FIG. 4 illustrates the operating principle of the circuit which controls the passage of the pulses of the tone generators in response to operation of the keys.

FIG. 4 broadly shows the principle according to which the generator pulses are passed to a reproduction device when a key is touched.

The pulses of negative polarity entering the figure on the left-hand side are supplied to the series arrangement of an impedance 13 and the capacitor 11 via a diode 12. As long as this capacitor is not charged, the incoming negative pulses are not passed by the diode 12. However, if the capacitor 11 is charged with the polarity shown in FIG. 4 by actuation of the key in question, the incoming pulses will pass the parts 12 and 13. Voltage variations will be set up across 13 which can be supplied to the reproduction device. Each pulse passing through 12, 13 and 11 will then discharge the capacitor a little, so that the oscillations passing through the impedance 13 will decay which is actually desired. Any other discharge of the capacitor 11, except for the damping circuit to be described hereinafter by means of a transistor 40, is not present. For the lower keys the capacitor 11 has a value of for example, 50 $\mu$f., while for the upper keps for example 1 $\mu$f., as a result of which the decay time (30 seconds and 0.5 second respectively) of the tones corresponds to that of the piano.

Figure 5:
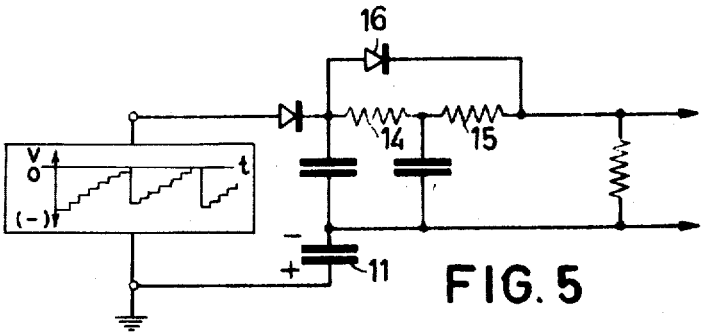
FIG. 5 shows an alternate form of the circuit shown in FIG. 4 for varying the intensity of the higher order harmonics with the intensity of the tone.

A property of a tone supplied by a piano is that the number of overtones decreases when the amplitude decreases. In order to be able to approach this effect electrically, the impedance 13 of FIG. 4 may be replaced by a composite network as shown in FIG. 5. This network comprises an RC-circuit, the resistance of which consists of two series-arranged members 14 and 15, whereas parallel to this series arrangement a rectifier 16 is provided having a given internal threshold voltage. The values of these resistors are chosen so that right after the key is struck the voltage across these two resistors is larger than the threshold voltage of the diode, thus the resistors are short-circuited by the diode. During the decap of the oscillations passing through 14 and 15, these resistors gradually become operative again, as a result of which the RC-filter becomes operative and the impedance for the high frequency tones decreases, thus the higher harmonics are cut off. It will be clear that a number of similar stages may be used to attenuate selected harmonics to secure the effect desired.

The way in which a tone may be caused to decay slowly or rapidly in accordance with the invention by releasing or not releasing the key touched or by actuating or not actuating a pedal will now be described with reference to FIG. 6. The circuit diagram shown in this figure comprises three successive parts I, II and III bordered by dotted lines. A circuit as shown in part I is present for each of the keys, while the circuit within the part II is common for [full] *five* groups of six keys each and part III shows the receiver circuit with reproduction device for these 30 keys, or for approximately ⅓ of the total number of keys which usually is 88. Consequently there are three reproduction devices, for example loudspeakers, each associated with approximately 30 keys. However, these numbers are only by way of example and the number of reproduction devices and the distribution of the keys between these reproduction devices may also be chosen differently.

The circuit present per key in part I comprises three parallel-arranged input impedances 22, 23 and 24, the values of which are in the proportion of 18:56:100, or approximately 1:3:6, and which are connected respectively to three frequency generators (not shown). The first of these generators supplies the required fundamental frequency and the two other generators supply the second and fourth harmonics respectively. The amplitudes of these oscillations which are supplied across the resistors 22, 23 and 24 respectively to the circuit will consequently be in the proportion of 100:56:18, in which intensity ratio they are supplied, via a rectifier 25, to the series arrangement of an impedance and the capacitor 11 as described in FIG. 4, in which the said impedance is of the type as described in FIG. 5 and in this case consists of the resistors 27 and 28 shunted by a diode 26 with a preselected threshold value, the parallel capacitors 21 and 29 and the emitter-base circuit of a transistor 30, upon the collector of which a direct voltage is impressed by means of a generator of, for example, 10 kc./s., a rectifier 67 and a capacitor 70 with smoothing circuit 68, 69, which is kept floating by the capacitor 70.

To obtain a chorus effect as described below, an "equal-tempered" third harmonics, having a frequency equal to $2^{19/12}$ of the fundamental frequency of the tone in question, is supplied to the rectifier 25 via a resistor 91 and a diode 92. There are factors, which produce amplitude modulation and/or frequency modulation of the oscillations generated when striking a single key or when striking several keys of the same tone, which are termed chorus effect.

The incoming negative pulses as described above are passed by the diode 25 only when and in so far as the capacitor 11 is charged with the polarity indicated. This charging occurs when actuating the key in question by the voltage pulse consequently produced in the coil 10 (compare FIGS. 2 and 3) which pulse is passed to the base-emitter circuit of a transistor 31, the collector of which has a constant voltage of for example −16 v.

The capacitor 11 is connected in series with a capacitor 32 (for example 10 μf.), which is shunted by a resistor 41 (for example 22K ohms). Parallel to the capacitor 32 there is also connected the series arrangement of a rectifier 64 and a coil 65 which is wound on limb 9 of the device shown in FIGS. 2 and 3 respectively. When a key is actuated or [stuck] *struck* voltages are produced in both coils 10 and 65 simultaneously and consequently corresponding voltages are produced across the capacitors 11 and 32 respectively.

The time constant of the capacitor 32 and the resistor 41 is so low that the capacitor 32 is completely discharged for the greater part of the time-lapse within which the same key can be repeatedly struck. In practice, approximately 0.2 second is chosen. Rectifier 64 preferably has a considerable internal threshold voltage. In practice, a silicon diode is used, for example of the type OA200. As a result that part of the voltage which is produced across the coil 65 remains below the threshold value of this rectifier, unless the key is struck vigorously in which case sufficient voltage is generated to overcome the internal threshold voltage of rectifier 64 which momentarily, due to the short time constant of 32, 41, increases the negative biasing potential at diode 25 to reduce the impedance thus providing a large voltage drop across resistors 27 and 28 and thus distinguish a vigorous from a gentle attack by the volume of sound which is a function of the voltage drop across 27, 28.

In order to have the tone rapidly decayed when the key touched is released again, another auxiliary windind 33 is provided on the magnetic circuit shown in FIGS. 2 and 3 on one of two parallel parts 34 and 35 which [from] *form* the yoke of the magnetic circuit. An auxiliary winding 33 is connected between a voltage source 37, of, for example, 6 kc./s. and the base of a transistor 40 which is connected in parallel with capacitor 11. A short-circuited winding 66 is mounted on the magnetic material between coils 33 and 10 to prevent any undesired penetration of the voltage at 6 kc./s. into the coil 10. The proportions of the magnetic circuit, that is the areas of portions 34 and 35, are chosen so that in the rest condition of the key the limb 35 of the yoke which includes the auxiliary winding 33 is saturated thus the impedance of this winding 33 is small with respect to parallel resistors 38 and 39 connected in the base circuit of the transistor 40. The current through the auxiliary winding 33 then consequently is maximum, as a result of which the transistor 40 is opened, and the capacitor 11 is rapidly discharged, thus the tone after the key is struck rapidly decays once [and] the key is restored to the position illustrated. By opening the switch 36 which, together with the corresponding switches of all the other keys, is connected to the usual piano pedal, the damping effect of the released key as above described may be removed since the auxiliary winding 33 then has a high impedance with respect to resistors 38 and 39, as a result of which the voltage at the base of the transistor 40 remains smaller than the internal base-emitter threshold voltage. Instead of separate pedal switches 36 for each of the keys, one common switch would be sufficient for interrupting the connection between the alternating current source of 6 kc./s. and all the auxiliary windings 33. The embodiment shown is chosen for illustration purposes only.

The amplified oscillations occurring in the collector-base circuit of the transistor 30 pass through the primary 42 of a transformer 43 which comprises another five primaries each associated with one of the five other keys. The secondary 44 is connected to a network located with this winding in part II of the circuit, which network comprises parallel resistors 45 and 46 and series inductances 47, 48 and parallel connected capacitors 49, 50 and 51. The π-filter formed by these elements constitutes a cut off filter which suppresses the undesired high harmonics for the six tones operated by the filter in question.

The load resistor 46 of this filter is connected to part III of the circuit in series with load resistors 52 to 55 of four other networks each operated by a group of six different keys. In this part, the incoming oscillations, after amplification by a transistor 56, are supplied to the primary 57 of a transformer 58 having two secondaries 59 and 60 which operate in push-pull arrangement across two transistor amplifiers 61 and 62 upon the loudspeaker 63. Consequently, this loudspeaker is associated with 30 tones, so that three loudspeakers are required to cover the whole keyboard of 88 keys.

These three loudspeakers can be proportioned differently in a known manner and in accordance with the frequencies to be reproduced so as to ensure a reproduction of the whole frequency range which is optimum. The most obvious distribution would be to associate the highest 30 tones with one of the loudspeakers, the lowest 30 tones with the second and the remaining medium tones with the third loudspeaker. However, it is good practice to distribute the tones of frequently occurring note combinations, for example chords, as much as possible over various groups of keys to obtain a more evenly distributed loading of the final amplifiers.

Figure 6:
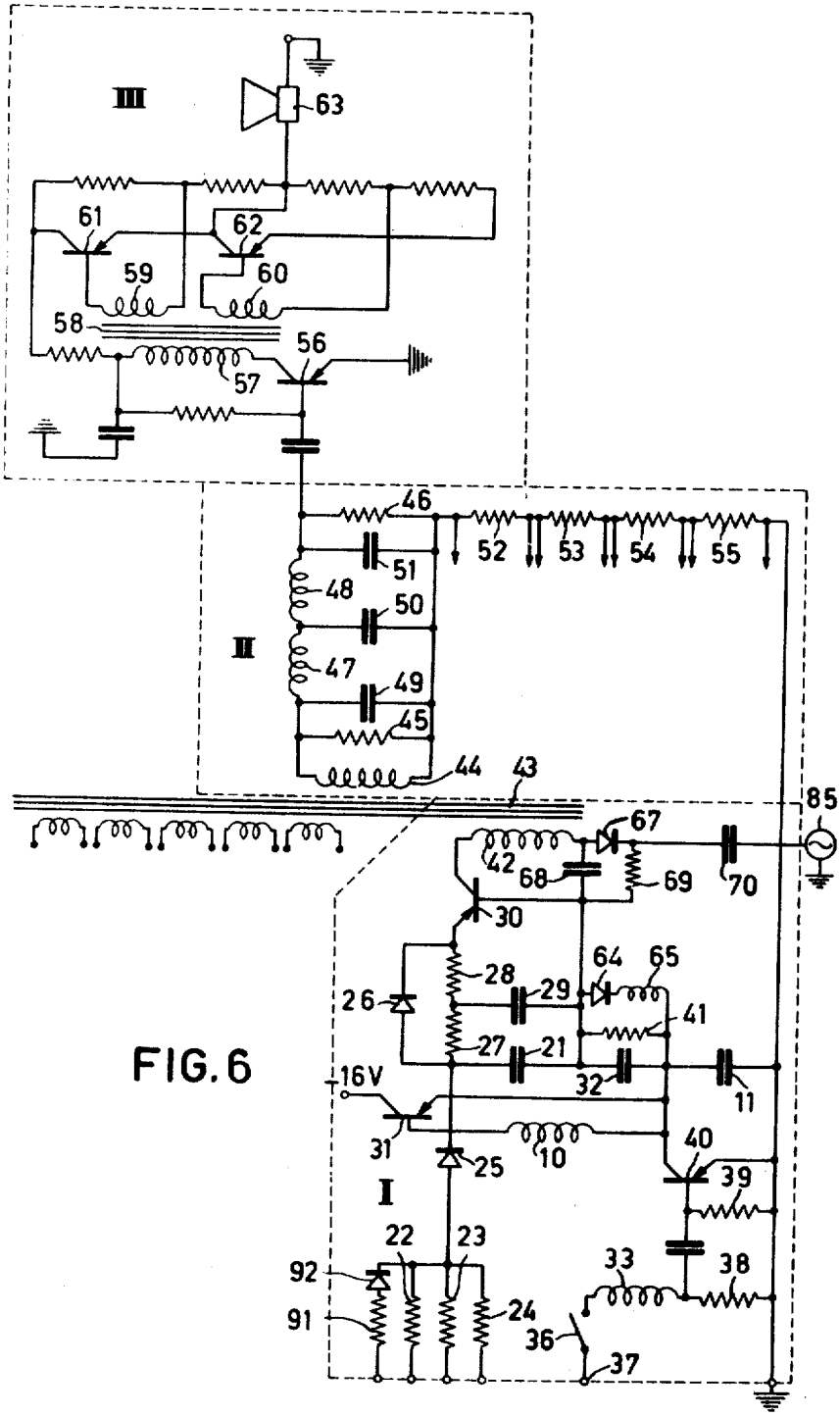
FIG. 6 is the circuit diagram of an embodiment of a piano according to the invention.
Figure 7:
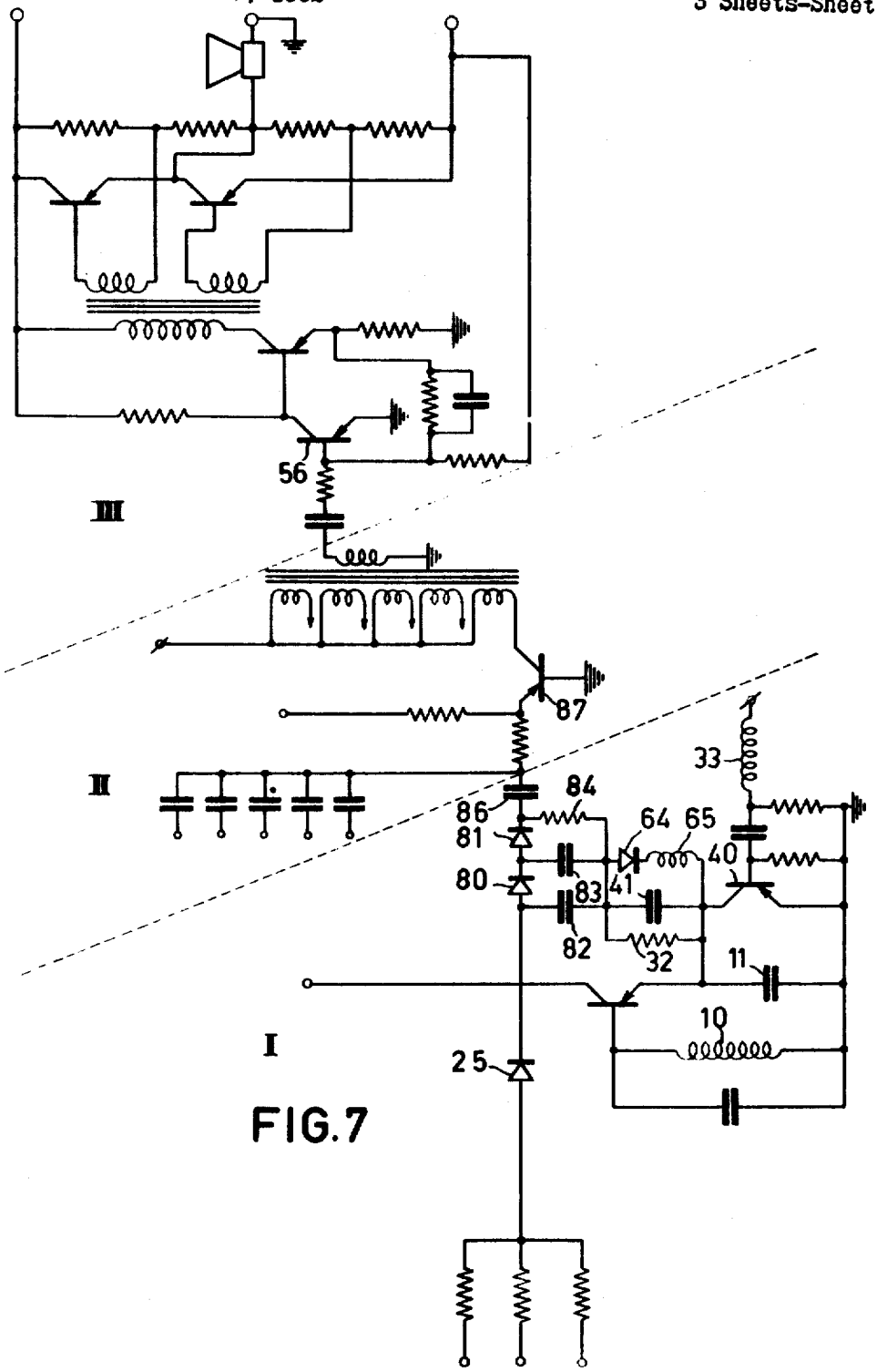
FIG. 7 shows a variation of a part of the diagram shown in FIG. 6.

In a variation of the circuit shown in FIG. 6, the filter 21, 26, 27, 28, 29 and 30 is replaced in FIG. 7 by two series diodes 80 and 81 (for example OA47) in the longitudinal branch and two capacitors 82 and 83 in the parallel branches, while the filter is loaded by a resistor 84. In this case the diode 81, as far as its input resistance is concerned, assumes the function of the transistor 30 of FIG. 6, so that this transistor and also its floating supply which includes generator 85 and the associated circuit elements 69 and 70 may be omitted. The cut off characteristic of this filter is then much more effective in the case of decreasing signal intensity, so that the low-pass filter 45–51 in FIG. 6 may also be omitted. Load resistor 84 (for example 2.2K ohm) is coupled to the input of a transistor 87 (for example of the type BCZ11) via a blocking capacitor 86, which transistor supplies the voltage to the input transistor 56 of the low frequency amplifier for a number of, for example, 6 keys in common.

To obtain sound effects to imitate other musical instruments, for example organs or wind instruments, devices may be incorporated by means of which the voltage across the capacitors 11 and 32 is kept constant and/or the oscillations produced are supplied via networks, the frequency characteristics of which correspond to the characteristic [formants] *formats* of such musical instruments. These devices may cover the whole keyboard or only one or more octaves and may be switchable.

What is claimed is:

1. An electronic keyboard instrument comprising key actuated means for generating a control voltage pulse having an amplitude corresponding to the intensity with which the key is struck, and circuit means responsive to said control voltage pulse for passing electrical oscillations initially as a function of the amplitude of the control voltage pulse and decaying in magnitude with time as a function of the magnitude of the passed oscillations and the electrical time constant of said circuit means.

2. An electronic keyboard instrument as set forth in claim 1 in which the key actuated means includes a coil, means for establishing a magnetic flux proximate said coil, and means for varying the flux proximate the coil as a function of the intensity with which the key is struck whereby a control voltage pulse is induced within the coil with an amplitude corresponding to the intensity with which the key is struck.

3. An electronic keyboard instrument as set forth in claim 1 in which the key actuated means includes a permanent magnet having at least two dissimilar magnetic poles mounted on one end of the key and movable therewith, a discontinuous member constructed of magnetic material having first and second branches each in proximity to a different one of said poles and inductively coupled thereto in the said proximate position, and a winding on one of said branches whereby the flux threading said winding changes to induce a voltage therein whenever the key is actuated and the poles of the permanent magnet are moved out of proximity with both said branches.

4. An electronic keyboard instrument as set forth in claim 1 in which the key actuated means includes a permanent magnet having at least two dissimilar magnetic poles mounted on one end of the key and movable therewith, a discontinuous member constructed of magnetic material having a center branch and first and second outside branches, said member being arranged so that the center branch and the first outside branch are proximate a different one of said poles when the key is not actuated and the pole proximate the center branch moves into proximity with the second outside branch while the other pole moves into proximity with the center branch when the key is actuated, and winding means on said center branch whereby the flux threading said winding falls to zero and reverses when the key is actuated to thereby induce a voltage in the said winding means corresponding to the intensity with which the key is struck.

5. An electronic keyboard instrument as set forth in claim 1 in which the oscillations applied to and passed by the circuit means have a step-like amplitude variation with time.

6. An electronic keyboard instrument as set forth in claim 1 in which said circuit means includes at least one resistance-capacitance network having a non-linear impedance.

7. An electronic keyboard instrument as set forth in claim 1 in which the oscillations applied to and passed by the circuit means include three frequencies in the proportion of 1:2:4.

8. An electronic keyboard instrument as set forth in claim 7 in which the lowest frequency has an amplitude at least four times the amplitude of the highest frequency.

9. An electronic instrument as set forth in claim 7 in which an equal-tempered third harmonic of the lowest frequency is present in the oscillations applied to and passed by the circuit means.

10. An electronic keyboard instrument comprising, key actuated means for generating first and second control voltage pulses each having an amplitude corresponding to the intensity with which the key is struck, switching means for passing electrical oscillations, first circuit means responsive to the first control voltage pulse for controlling the initial passage of the oscillation through the switch means as a function of the said first control voltage pulse amplitude and thereafter as a function of the electrical time constant of the first circuit means, and second circuit means in series with said first circuit means and having a shorter electrical time constant responsive to a predetermined minimum control voltage pulse amplitude of said second control voltage pulses whereby the oscillations passed by the switch means are briefly intensified whenever the intensity with which the key is struck is sufficient to generate a second control voltage pulse amplitude exceeding the said predetermined minimum amplitude.

11. An electronic keyboard instrument as set forth in claim 10 in which the key actuated means includes a first and second coil, means for establishing a magnetic flux proximate each said coils, and means for varying the flux as a function of the intensity with which the key is struck whereby first and second control voltage pulses are induced in the first and second coils, respectively, each with [a] *an* amplitude corresponding to the intensity with which the key is struck.

12. An electronic keyboard instrument as set forth in claim 10 in which the key actuated means includes a permanent magnet having at least two dissimilar poles mounted on one end of the key and movable therewith, a discontinuous member constructed of magnetic material having first and second branches each in proximity to a different one of said poles and inductively coupled thereto, and first and second winding means coupled to the flux threading the branches whereby first and second control voltage pulses are induced in said first and second winding means, respectively, when the key is actuated and the poles are moved out of proximity with both of said branches.

13. An electronic keyboard instrument as set forth in claim 10 in which the key actuated means includes a permanent magnet having at least two dissimilar poles mounted on one end of the key and movable therewith, a discontinuous member constructed of magnetic material and having a center branch and first and second outside [brances] *branches*, said member being arranged so that the center and first outside branches are proximate a different one of said poles when the key is not actuated and the pole proximate the center branch moves into proximity with the second outside branch while the other pole moves into proximity with the center branch when the key is actuated, and first and second winding means on said center branch whereby the flux threading said winding means falls to zero and reverses when the key is actuated to thereby induce first and second control voltage pulses in said first and second winding means, respectively, each of which corresponds in amplitude to the intensity with which the key is struck.

14. An electronic keyboard instrument as set forth in claim 10 in which the oscillations applied to and passed by the switching means have a step-like amplitude variation with time.

15. An electronic keyboard instrument as set forth in claim 10 in which said switching means is followed by at least one resistance-capacitance network having a non-linear impedance.

16. An electronic keyboard instrument as set forth in claim 10 in which the oscillations applied to and passed by the switching means include three frequencies in the proportion of 1:2:4.

17. An electronic keyboard instrument as set forth in claim 16 in which the lowest frequency has an amplitude at least four times the amplitude of the highest frequency.

18. An electronic keyboard instrument as set forth in claim 16 in which an equal-tempered third harmonic of the lowest frequency is present in the oscillations applied to and passed by the switching means.

19. An electronic keyboard instrument comprising, key actuated means for supplying a control voltage pulse having an amplitude corresponding to the intensity with which the key is struck and selectively an electrical manifestation indicative of the key position, and circuit means responsive to said control voltage pulse and said electrical manifestation for passing electrical oscillations initially as a function of the amplitude of the control voltage pulse and which decays in magnitude with time as a function of the magnitude of the passed oscillations and the electrical time constant of the said circuit means and for terminating the passage of oscillations as soon as the electrical manifestation indicates that the key occupies a predetermined position.

20. An electronic keyboard instrument as set forth in claim 19 in which the key actuated means includes a first and second coil, a selectively operable switch means and a high frequency voltage source in series with said second coil, means for establishing a magnetic flux proximate said coils, and means for varying the said flux as a function of the intensity with which the key is struck whereby a control voltage pulse is induced within the first coil having an amplitude which corresponds to the intensity with which the key is struck and the impedance of said second coil with respect to the high frequency voltage source varies as a function of the flux proximate said second coil.

21. An electronic keyboard instrument as set forth in claim 19 in which the key actuated means includes a permanent magnet having at least two dissimilar magnetic poles mounted on one end of the key and movable therewith, a member constructed of magnetic material having at least two discontinuous terminations each in proximity to a different one of said poles when the key is unactuated whereby a flux path between the poles is established through the member, a first and second winding inductively coupled to said flux path, and a selectively operable switch means and a high frequency voltage source in series with said second winding, said first winding providing a control voltage pulse having an amplitude corresponding to the intensity with which the key is struck as the field collapses when, as a result of striking the key the permanent magnet is positionally changed with respect to the above said terminations and the impedance of said second winding changes with respect to said high frequency voltage as the field coupled to the second winding changes with key movement.

22. An electronic keyboard instrument comprising, key actuated means for generating first and second control voltage pulses each having an amplitude corresponding to the intensity with which the key is struck and selectively an electrical manifestation indicative of the key position, switching means for passing electrical oscillations, first circuit means responsive to the first control voltage pulse for controlling the initial passage of the oscillations through the switch means as a function of the first control voltage pulse amplitude and thereafter as a function of the electrical time constant of the said first circuit means, second circuit means similar to said first circuit means but with a shorter electrical time constant in series therewith responsive to a predetermined minimum control voltage pulse amplitude of said second pulse whereby the oscillations passed by the switch means are briefly intensified whenever the key is struck with sufficient intensity to generate a second control voltage pulse amplitude exceeding the said predetermined minimum amplitude, and circuit means responsive to said electrical manifestation for changing the electrical time constant of the first circuit means whenever said electrical manifestation assumes a predetermined condition.

23. An electronic keyboard instrument as set forth in claim 22 in which the key actuated means includes first, second and third winding means, means for establishing a magnetic flux proximate each said winding means, a selectively operable switch and a high frequency voltage source in series with said third winding means, and means for varying the flux as a function of the intensity with which the key is struck whereby first and second control voltage pulses are induced in the first and second winding means, respectively, each having an amplitude corresponding to the intensity with which the key is struck and the impedance of said third winding means with respect to the high frequency voltage source varying as a function of the flux proximate said third winding means.

24. An electronic keyboard instrument as set forth in claim 22 in which the key actuated means includes, a permanent magnet having at least two dissimilar poles mounted on one end of the key and movable therewith, a member constructed of magnetic material having at least two discontinuous terminations each in proximity to a different one of said poles when the key is unactuated whereby a flux path between the poles is established through the member, first, second and third winding means coupled to the flux threading the member, a selectively operable switch means and a high frequency voltage source in series with said third winding means, said first and second winding means providing first and second control voltage pulses, respectively, when the key is actuated and the poles are moved out of proximity with both terminations of the magnetic member and the impedance of said third winding varying with respect to said high frequency voltage source as the field coupled to the third winding means varies with key movement.

*25. An electronic piano comprising a key, electronic transducer means for producing a signal in accordance with the force of the striking of said key, an electronic tone generator for producing a tone signal corresponding to said key and including means for varying the amplitude of said tone signals in accordance with the amplitude of said transducer means signal, and audio output means for producing an audio output in accordance with said tone signal.*

*26. The combination of claim 25 wherein said electronic transducer means includes a coil, means for establishing a magnetic flux proximate said coil, and means for varying the flux proximate the coil as a function of the intensity with which the key is struck whereby a control voltage pulse is induced within the coil with an amplitude corresponding to the intensity with which the key is struck.*

*27. The combination of claim 25 wherein said key includes a magnet mounted to said key, means for controlling the movement of said magnet by said key, said electronic transducer means including a coil, said magnet and coil being positioned to vary the inductance of said coil in accordance with the velocity of said magnet.*

*28. Electronic musical apparatus comprising key means, electronic transducer means for producing a signal in accordance with the force of the striking of said key, an electronic tone generator for producing a tone signal corresponding to said key means and for varying said tone signal amplitude in accordance with the amplitude of said transducer means signal, audio output means for producing an audio output in accordance with the output of said electronic tone generator, key position sensing means, said key position sensing means being operative in accordance with the depression of said key means to produce an output signal, said electronic tone generator being additionally sensitive to said position sensing means output signal to produce a tone signal corresponding to said key means, said last-mentioned tone signal being of a sustained amplitude.*

*29. The combination of claim 28 wherein said key position sensing means includes a coil, means for establishing a magnetic flux proximate said coil, and means for varying the flux proximate the coil as a function of the intensity with which the key is struck whereby a control voltage pulse is induced within the coil with an amplitude*

*corresponding to the intensity with which the key is struck.*

*30. The combination of claim 28 wherein said key position sensing means includes a magnet mounted to said key, means for controlling the movement of said magnet by said key, said electronic transducer means including a coil, said magnet and coil being positioned to vary the inductance of said coil in accordance with the velocity of said magnet.*

References Cited

The following references, cited by the Examiner, are of record in the patented file of this patent or the original patent.

UNITED STATES PATENTS

| | | | |
|---|---|---|---|
| 2,340,213 | 1/1944 | Ellesworth | 336—30X |
| 2,460,095 | 1/1949 | Love | 322—46X |
| 2,486,208 | 10/1949 | Rienstra | 84—1.26 |
| 2,569,521 | 10/1951 | Greaves et al. | 84—1.26 |
| 2,789,224 | 4/1957 | Leonard | 328—58X |
| 2,809,547 | 10/1957 | Le Caine | 84—1.26 |
| 2,941,170 | 6/1960 | McCoy | 336—30 |

OTHER REFERENCES

Hurley: Junction Transistor Electronics, Wiley & Sons, 1958, p. 340 relied on.

JOHN S. HEYMAN, Primary Examiner

U.S. Cl. X.R.

84—1.13, 1.15

PO-1050
(5/69)

UNITED STATES PATENT OFFICE
CERTIFICATE OF CORRECTION

Patent No Re. 27,015 Dated December 29, 1970

Inventor(s) p. R. DIJKSTERHUIS ET AL

It is certified that error appears in the above-identified patent and that said Letters Patent are hereby corrected as shown below:

Column 3, line 1, cancel "is".

Signed and sealed this 2nd day of July 1974.

(SEAL)
Attest:

EDWARD M.FLETCHER,JR.
Attesting Officer

C. MARSHALL DANN
Commissioner of Patents